Patented June 18, 1929.

1,718,187

UNITED STATES PATENT OFFICE.

GEORGE M. BARTLETT, OF MERCHANTVILLE, NEW JERSEY, ASSIGNOR TO CAMPBELL SOUP COMPANY, A CORPORATION OF NEW JERSEY.

METHOD OF CANNING BAKED BEANS.

No Drawing.  Application filed July 18, 1928. Serial No. 293,790.

Heretofore, those engaged in the canning of various food products have not attempted, to any great extent, to pack baked beans in tins. When baked beans have been canned, the product has not been particularly satisfactory.

Under the ruling of the Board of Food and Drug Inspection, beans packaged and labeled as "baked beans" must be baked in open containers in the presence of dry hot air. To meet these requirements, those canning baked beans have usually baked the beans in a batch in a large crock or pot, and after the baking has been completed, they have transferred the beans, so baked, into the cans and then sealed the cans.

But the transference of soft baked beans from a crock or pot to a can invariably entails the breaking of the skins of some of the beans and mashing of others, with the result that too much sauce enters the broken beans, making those beans soft and mushy. Moreover, some of the pulp of the beans separates from the beans and mixes with the sauce, thickening the sauce and making the sauce turbid. This is very undesirable as it injures the appearance of the product and makes uniformity of product impossible. The difference in the number of beans broken in different cans and the length of time the cans are kept before use will cause the contents of the cans, even when filled with beans of the same batch, to differ greatly in appearance, taste and quality.

It must be appreciated that uniformity of a product in tins is one of the most important ends to be attained in the canning industry. A purchaser of canned goods expects every can of a given line and packaged by a given packer, to be exactly like every other can which he has previously purchased of that particular brand and if the contents of one can of beans be soft and with a thick sauce and another can have fewer broken beans and consequently thinner sauce, and if the cans differ substantially as to color, taste and substance, that line of goods will be avoided by the trade in favor of the goods put up by another canner, the contents of whose tins have been found to be uniform in condition of pack, appearance and taste.

It is practially impossible to transfer baked beans to cans and at the same time preserve all of the beans intact and unbroken, and a small variation in the number of broken beans will greatly vary the appearance and quality of the pack.

With these considerations in mind, an object of the present invention is to produce canned baked beans of the best quality free from broken beans and with a uniform sauce, unmixed with the pulp of crushed beans, the contents being of superior appearance and uniformly of the very best quality.

A further object of my invention is to produce a canned baked bean product without making it necessary to transfer the beans, after cooking, into tins, or to subject the beans to any handling or treatment whereby the cans are agitated and the contents are broken, thereby eliminating the liability of producing cans of beans which are mashed and discolored and seasoned with a thick sauce.

A further object of my invention is to bake the beans in the very cans or tins in which they are to be later hermetically sealed and placed on the market.

A further object of my invention is to provide a method of baking beans in a shorter time than that usually required for the production of baked beans with a consequent reduction in the cost of production, and to effect uniformity or standardization in the product.

In carrying out my improved process, I use only the best hand-picked beans containing not more than one and one-half per cent spot or blemish. The entire quantity of beans to be baked is first soaked in cold water for about ten hours.

After soaking in cold water has been completed, the beans are carefully picked over and those beans which are not water-absorptive; those beans having defects, such as black spots, which are generally more easily observed in the soaked swollen beans than in dry beans; and any broken beans are removed. The remaining beans are now in a substantially perfect condition, unbroken, of substantially the same size and containing the same amount of water, absorbed by the beans during the water soaking step.

The beans are next blanched (parboiled) but without breaking the skins. This parboiling is preferably carried to a point where the skins or hulls of the beans would break if punctured with a pin.

These substantially perfect parboiled beans now are placed in the cans or tins in which the beans are to be marketed, together with a piece of pork of the correct weight for the quantity of beans in the can. Each can is thus filled with beans to about 80% of the full capacity of the can.

At this step, the seasoning and flavoring ingredients, mixed with water and called the "sauce," are placed in the cans, the level of the sauce being a little above the level of the beans.

For convenience, a normal source for the beans may be assumed to be an aqueous sauce of 100 units concentration. That is the convenient way for designating the strength of a normal aqueous sauce. A sauce of 150 units concentration would have 1.5 times the weight of ingredients (other than water) that an equal volume of a 100 unit concentration sauce would have. The mode of treatment with different sauces will be referred to again below.

The open cans, so filled with beans, pork and sauce, are preferably placed on a carrier of any suitable style and slowly passed through the oven. The time when the cans or tins are placed on the carriers is immaterial, for the carrier which conveys the tins through the oven is preferably the same carrier that conveys the tins under the can filling machines and to the sealing machines, in which case the carrier would pass directly from the filling machines through the oven, to the sealing machines.

The temperature of the oven is preferably between 400 and 500° F. and preferably at or about 450° F. and the beans are subjected to the high heat of the oven for a time sufficient to substantially bake the beans in the open cans.

But because the oven is relatively hot, and because the quantity in each can is relatively small, as compared with the contents of a large bean pot, the beans are almost immediately brought to a relatively high cooking temperature, with the result that the baking is completed in considerably less time than that required to cook beans at the relatively low temperatures employed in the baking of beans in the home.

Upon the removal of the tins from the oven, a quantity of water is added to each can sufficient to compensate for the water lost by evaporation during the baking step and to dilute the sauce in the can to the normal strength or concentration of 100 units and if desired an additional amount of normal or concentrated sauce may be added at this point to impart to the beans the particular flavor that may be desired. The cans are next hermetically sealed, while hot, and are then processed or sterilized for about one and a quarter hours at a temperature of substantially 250° F. The cans are then transferred to the labeling machine in which a label is wrapped around each tin.

The sauce added to the beans may be of different concentrations. Thus the sauce which is placed in the tins before the baking step may be of 100 units concentration, a normal sauce. When that sauce is used in the process, the sauce becomes more concentrated during the baking step by the evaporation of the water and the water added to the cans after the baking operation or step will be merely sufficient to bring the concentration back to 100 units. Only enough water need be added to compensate for the water evaporated during the baking step and that amount of water will dilute the sauce to normal concentration.

It is preferable, however, to use a sauce of a higher concentration, as for instance, a sauce of up to 150 units concentration, because a concentrated sauce tends to penetrate more deeply into the beans and to impart to the beans a more desirable color. After baking the beans with a sauce of higher concentration than normal, the amount of water which is added is that which would be required to compensate for the evaporation plus enough more water to dilute the higher concentration of sauce down to a normal 100 unit concentration.

In some cases, the beans may be baked with only a part of the ingredients of the sauce and with the pork, the sauce being substantially water. When the invention is so practised, and the baking has been completed, water may be added, if desired, sufficient to make up for the loss in the evaporation and then a sauce of any desired concentration (preferably a normal sauce) may be added to the baked beans.

I prefer, however, to follow the second example above given and to bake the beans in a sauce of concentration higher than normal and to then dilute the sauce in the can of baked beans down to the normal concentration.

Throughout the treatment of the beans care is taken not to agitate the contents of the cans, for agitation tends to break some of the beans, and as above stated, broken beans in the can greatly affect the quality and appearance of the product.

It is to be observed that although the tins were not completely filled with blanched beans, the tins will be substantially full of baked beans after the baking step has been completed and the water or sauce or both water and sauce have been added, for the beans will continue to absorb water during the baking of the same, and will swell sufficiently to fill the can.

The process may be varied somewhat from the exact proportions and times above given by way of examples, without departing from the spirit and scope of my invention. In the preferred mode of carrying out my novel method of baking and canning beans, as above described, the baking in the oven is completed in fifteen or twenty minutes. The baking may be continued longer, however, e. g., up to one-half or three-quarters of an hour, provided the processing be effected at correspondingly low temperatures or for a shorter length of time, so as to avoid at the temperatures above given, any over cooking of the sauce or beans.

Having thus described my invention, what I claim and desire to protect by Letters Patent of the United States, is:

1. The method of canning baked beans which consists in soaking the beans in cold water, then removing those beans which are not sufficiently absorptive of water, those which are spotted and otherwise defective and those which are broken, then blanching the beans in hot water until the skins of the beans would break if pricked, drawing off the blanching water to waste, then placing the perfect blanched beans remaining into the tins in which they are to be marketed, and placing in each tin a piece of pork appropriate for the quantity of beans in the tin, filling the tins with beans to about 80% of the capacity of the tin, adding a sauce of from 100 to 150 units concentration until the sauce well covers the upper surface of the beans in the tins, then passing the tins of beans through the baking oven heated to a temperature of substantially 450° F. with the tops of the tins open to the hot dry air of the oven, and without agitating the contents of the tins, retaining said tins in the oven until the beans are substantially baked, then removing the tins from the oven and adding thereto sufficient water to compensate for the loss of water due to evaporation during the baking step and to dilute the sauce to a 100 unit concentration, then hermetically sealing the tins while hot, and processing for about 1¼ hours at a temperature of substantially 250° F.

2. The method of canning baked beans which consists in soaking the beans in cold water for about ten hours, then removing those beans which are not sufficiently absorptive of water, those which are spotted and otherwise defective and those which are broken, then blanching the beans in hot water until the skins of the beans would break if pricked, drawing off the blanching water to waste, then placing the perfect blanched beans remaining into the tins in which they are to be marketed, and placing in each tin a piece of pork appropriate for the quantity of beans in the tin, filling the tins with beans to about 80% of the capacity of the tin, then adding an aqueous liquid sauce of from 100 to 150 units concentration until it covers the upper surface of the beans, then baking the beans in the tins without agitating the contents of the tins and with the tops of the tins open to atmosphere, then removing the beans from the oven and adding sufficient water to compensate for the loss of water from the tin due to evaporation during the baking, and to dilute the sauce down to a substantially 100 unit concentration, then hermetically sealing the tins, while hot and processing for about 75 minutes at a temperature of substantially 250° F.

3. The method of canning baked beans which consists in thoroughly soaking the beans in cold water, then removing those beans which are not sufficiently absorptive of water, those which are spotted and otherwise defective and those which are broken, then blanching the beans in hot water until the skins of the beans would break if pricked, drawing off the blanching water to waste, then placing the perfect blanched beans remaining into the tins in which they are to be marketed, and placing in each tin a piece of pork appropriate for the quantity of beans in the tin, filling the tins with beans to about 80% of the capacity of the tin, then adding an aqueous liquid sauce of from 100 to 150 units concentration until it covers the upper surface of the beans, then baking the beans in the tins at a temperature of about 450° F. without agitating the contents of the tins and with the tops of the tins open to atmosphere, then removing the beans from the oven and adding sufficient water to compensate for the loss of water from the tin due to evaporation during the baking, and to dilute the sauce down to a substantially 100 unit concentration, then hermetically sealing the tins, while hot and processing for about 75 minutes at a temperature of substantially 250° F.

4. The method of canning baked beans which consists in soaking the beans in cold water, then removing the non-absorptive broken and spotted beans, then blanching the beans until the skins would burst, if pricked, then placing the perfect blanched beans in the tins in which they are to be marketed, together with a piece of pork appropriate to the quantity of beans in the tin, the tins being filled to substantially 80% of their capacity, then adding an aqueous sauce of any desired concentration until it well covers the upper surface of the beans, then baking the beans in the tins at a temperature of about 450° F., and then bringing the volume of the sauce in the can to fill the can, and the concentration to any desired degree of concentration, then sealing the tins hermetically and processing the same.

5. The method of canning baked beans which consists in soaking the beans, then removing the non-absorptive, broken and spotted beans, then blanching the beans, then placing the substantially perfect blanched beans in the tins in which they are to be marketed, together with a piece of pork appropriate to the quantity of beans in the tin, the tins being filled to substantially 80% of their capacity, then adding an aqueous sauce of any desired concentration until it well covers the upper surface of the beans, then baking the beans in the tins and then bringing the volume of the sauce in the can to fill the can, and the concentration to any desired degree of concentration, then sealing the tins hermetically and processing the same.

6. The method of canning baked beans which consists in soaking the beans in cold water, then removing the non-absorptive, broken and spotted beans, then blanching the beans until the skins would burst, if pricked, then placing the perfect blanched beans in the tins in which they are to be marketed, together with a piece of pork appropriate to the quantity of beans in the tin, the tins being filled to substantially 80% of their capacity, then adding an aqueous sauce of any desired concentration until it well covers the upper surface of the beans, then baking the beans in the tins at a temperature of about 450° F., from fifteen minutes to substantially forty-five minutes, and then bringing the volume of the sauce in the can to fill the can, and the concentration to any desired degree of concentration, then sealing the tins hermetically and processing the same.

In witness whereof, I have hereunto set my hand this 17th day of July, 1928.

GEORGE M. BARTLETT.